United States Patent
Rattan et al.

(10) Patent No.: US 9,912,261 B2
(45) Date of Patent: Mar. 6, 2018

(54) VARIABLE FREQUENCY DRIVE MOTOR CONTROL

(71) Applicant: Halliburton Energy Services, Inc., Houston, TX (US)

(72) Inventors: Warren Neil Rattan, Duncan, OK (US); Charles Edward Neal, III, Duncan, OK (US); James Douglas Funkhouser, Duncan, OK (US); Derek Williams, Duncan, OK (US); Gary Lee Cline, Duncan, OK (US); Derek James Abel, Duncan, OK (US); Troy Dale Bachman, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 73 days.

(21) Appl. No.: 15/025,836

(22) PCT Filed: Sep. 2, 2015

(86) PCT No.: PCT/US2015/048157
§ 371 (c)(1),
(2) Date: Mar. 29, 2016

(87) PCT Pub. No.: WO2017/039656
PCT Pub. Date: Mar. 9, 2017

(65) Prior Publication Data
US 2017/0264220 A1    Sep. 14, 2017

(51) Int. Cl.
*H02P 6/04* (2016.01)
*H02P 23/00* (2016.01)
(Continued)

(52) U.S. Cl.
CPC ............... *H02P 6/04* (2013.01); *E21B 33/14* (2013.01); *H02P 23/0077* (2013.01); *H02P 27/08* (2013.01)

(58) Field of Classification Search
CPC ........................................................ H02P 6/04
(Continued)

(56) References Cited

U.S. PATENT DOCUMENTS

| 5,883,489 A | 3/1999 | Konrad |
| 8,085,514 B2 * | 12/2011 | Taylor .................. H02H 7/0822 361/23 |

(Continued)

FOREIGN PATENT DOCUMENTS

| JP | 2000218613 A | 8/2000 |
| JP | 2005051900 A | 2/2005 |

OTHER PUBLICATIONS

"International Application Seria No. PCT/US2015/048157, International Search Report dated Feb. 26, 2016", 3 pgs.

(Continued)

*Primary Examiner* — Erick Glass
(74) *Attorney, Agent, or Firm* — Chamberlain Hrdlicka

(57) ABSTRACT

Various embodiments include a variable frequency drive motor control apparatus. The apparatus includes a main controller having a first interface. A motor controller is coupled to and controls an electric motor, the motor controller further coupled to the main controller. A network switch is coupled to the main controller, the motor controller, and a remote controller over respective digital connections. The remote controller has a second interface. The network switches data between the first interface, the second interface, and the motor controller. A network coupler is coupled between a variable frequency drive controller and the motor controller.

8 Claims, 5 Drawing Sheets

(51) Int. Cl.
*H02P 27/08* (2006.01)
*E21B 33/14* (2006.01)

(58) Field of Classification Search
USPC .......................................................... 318/461
See application file for complete search history.

(56) References Cited

U.S. PATENT DOCUMENTS

| 9,712,098 B2* | 7/2017 | Kidd ........................ H02P 25/04 |
| 2005/0146221 A1 | 7/2005 | Pettigrew |
| 2008/0060846 A1* | 3/2008 | Belcher .................. E21B 17/042 |
| | | 175/25 |
| 2009/0105059 A1* | 4/2009 | Dorry .................... B04B 1/2016 |
| | | 494/37 |
| 2010/0235002 A1* | 9/2010 | Dufilho .............. B01D 33/0315 |
| | | 700/275 |
| 2015/0130376 A1 | 5/2015 | Pace |

OTHER PUBLICATIONS

"International Application Seria No. PCT/US2015/048157, Written Opinion dated Feb. 26, 2016", 5 pgs.

* cited by examiner

VARIABLE FREQUENCY DRIVE MOTOR CONTROL

PRIORITY APPLICATION

This application is a U.S. National Stage Filing under 35 U.S.C. 371 from International Application No. PCT/US2015/048157, filed Sep. 2, 2015; which application is incorporated herein by reference in its entirety.

BACKGROUND

During a well drilling operation, cement casing is typically inserted into the borehole to provide structural support for the borehole in unstable geological formations in addition to sealing the borehole. The casing is typically cemented in place by circulating a cement slurry through the inside of the casing and out into the annulus through a casing shoe at the bottom of the casing string.

In an offshore drilling operation, the cementing operation may be accomplished by an offshore cementing skid. One or more electric motors on the skid provide the pressure used to inject the cement into the wellbore. It is desirable to control the operation of these motors in order to control the flow of cement into the wellbore.

DETAILED DESCRIPTION

Some of the challenges noted above, as well as others, can be addressed by a VFD motor control apparatus. The apparatus includes the capability of communicating with and controlling a rig's variable frequency drive in a VFD motor control system. Such an apparatus may reduce the quantity of cables used to control the electric motors used on offshore cementing skids during a cementing operation.

Figure 1:
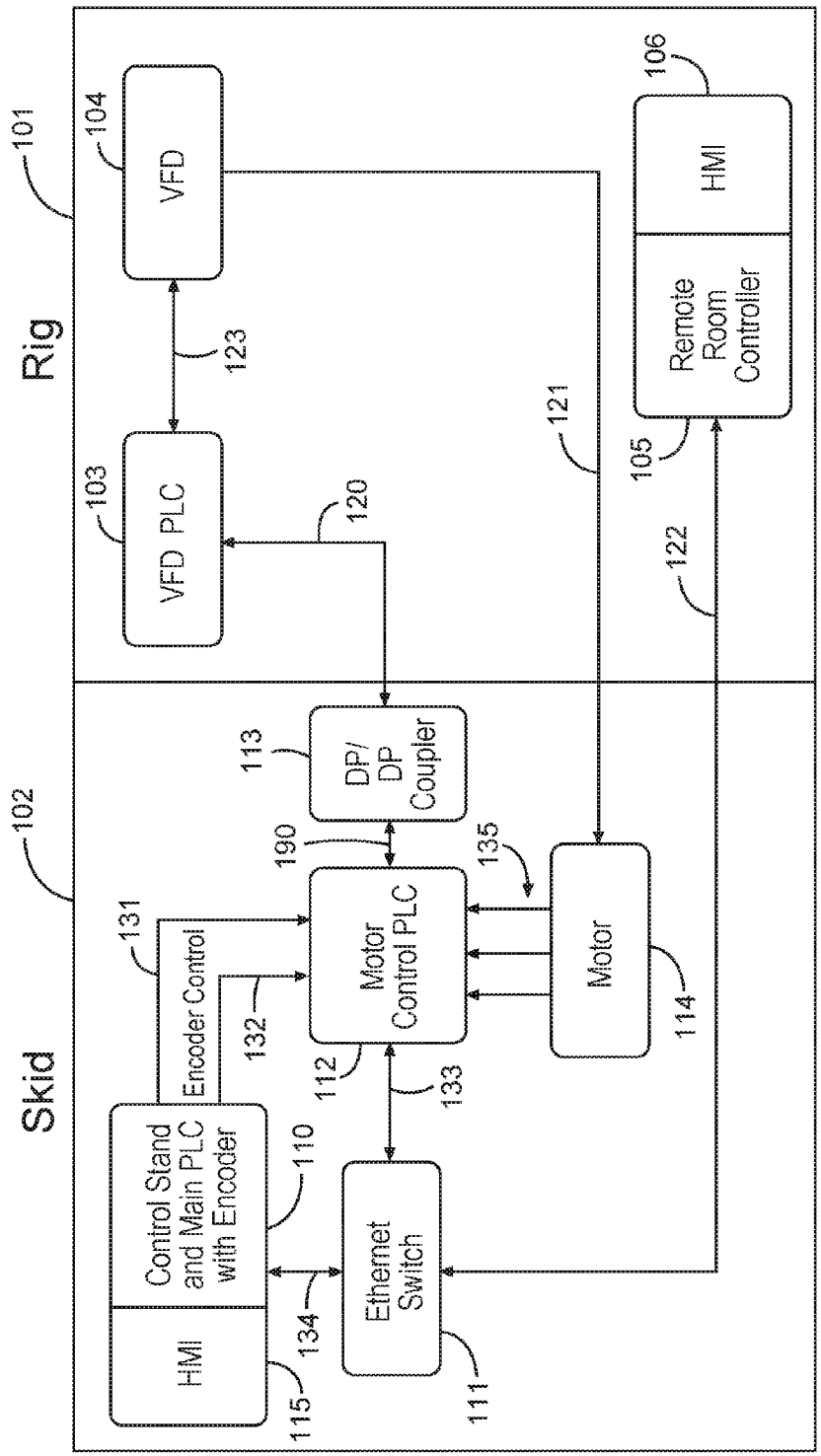
FIG. 1 is a block diagram showing a variable frequency drive (VFD) motor control system, according to various examples of the disclosure.
Figure 2:
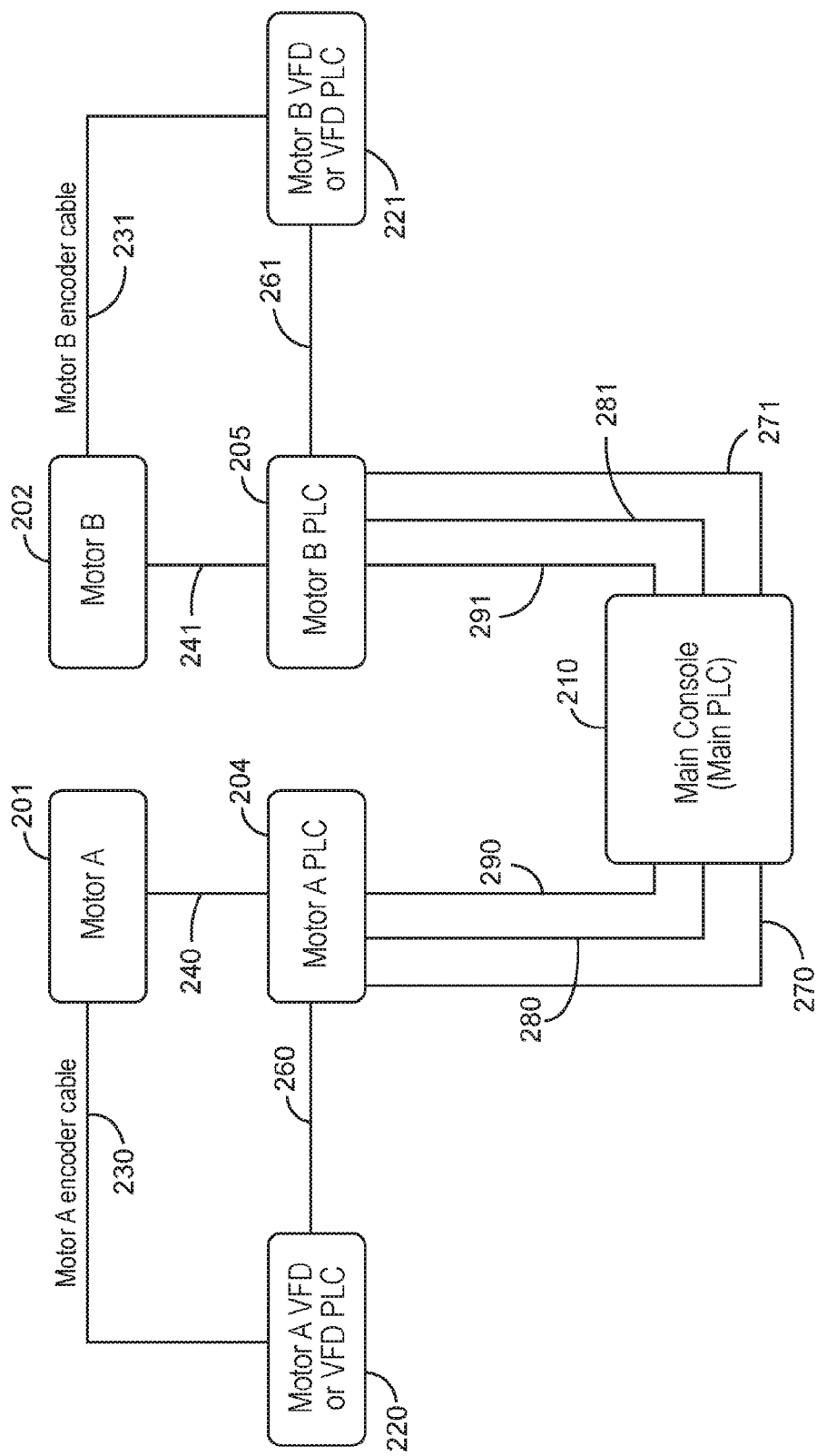
FIG. 2 is a block diagram showing a control configuration for redundancy of a VFD motor control system with a plurality of motors, according to various examples of the disclosure

Subsequent discussion of the apparatus and systems of FIGS. 1 and 2 refer to Ethernet connections between elements. The Ethernet connection is for purposes of illustration only as other forms of digital connections that transfer digital signals may be used.

The VFD used in the present embodiments may be any brand or type of VFD. Different brands/types of VFDs may have different methods for sending or receiving digital data to or from the motor controller. The present embodiments have the ability to select the brand/type of VFD through a user interface. The motor controller then knows which algorithm to use for which brand/type of VFD.

FIG. 1 is a block diagram showing a VFD motor control system, according to various examples of the disclosure. The system is shown comprising a portion of a rig 101 and a skid 102 with various functions in each block 101, 102. Other embodiments may incorporate different functions in each of the rig 101 or skid 102.

The rig 101 includes the equipment used to drill a wellbore. For example, the rig 101 may include mud tanks, mud pumps, a derrick or mast, drawworks, rotary table, a drillstring, and power generation equipment. The rig 101 in the example of FIG. 1 further includes a NTH) 104, a NTH) programmable logic controller (PLC) 103, and a remote room controller 105.

The VFD 104 is coupled to the VFD PLC 103 over a communication line 123. The VFD 104 is a motor controller that is coupled to and drives an electric motor 114 by varying a frequency, voltage, and/or pulse width modulated signal (PWM) supplied to the electric motor 114. The VFD 104 is coupled to the electric motor 114 on the skid 102 over a power control line 121.

A motor control PLC 112 is the computer that provides the control of the VFD 104 over the communication line 190 to DP/DP Coupler 113 onto WAD PLC 103 over communication line 120 and on to the VFD 104 over communication line 123. For example, the motor control PLC 112 may execute a motor control algorithm that determines desired motor parameters such as: how the motor is started or stopped under normal conditions, how the motor is started or stopped under special situations (e.g., fault conditions), when to turn on or off blower motors, the acceleration or deceleration rate of the motor, torque, shaft speed, as well as other motor parameters. The VFD PLC 103 provides a "pass through" of motor control information supplied by the motor control PLC 112. Motor control PLC 112 provides the desired motor parameters to the VFD PLC 103 to be passed onto the VFD 104, over the communication line 123, and the VFD 104 then determines the frequency, voltage and/or PWM signal to supply to the electric motor 114, over the power control line 121, in order for the motor 114 to achieve the desired motor parameters.

The remote room controller 105 on the rig 101 is a computer that includes a human-machine interface (HMI) 106 (i.e., user interface). The HMI 106 includes a display (e.g., liquid crystal display (LCD), LCD touch screen, cathode ray tube (CRT), light emitting diode (LED)) that may use a graphical user interface, a keyboard, or some other way to input commands to enable an operator to control operation of the electric motor 114. For example, the display of the HMI 106 may include various icons that the operator may touch to initiate or stop various electric motor functions. The remote room controller 105 is coupled to a port of an Ethernet switch 111 on the skid 102 through an Ethernet line 122.

The skid 102 comprises a metal frame on which portable equipment may be mounted to facilitate handling with cranes or flatbed trucks. The skid 102 may be mobile and may be coupled to the rig 101 during a drilling operation. In the example of FIG. 1, the skid further includes a control stand with main PLC 110, a motor control PLC 112, a decentralized peripheral (DP)/DP coupler 113, the Ethernet switch 111, and the electric motor 114. The control stand with the main PLC 110 further includes another HMI 115 (i.e., user interface). The electric motor 114 may be used to pump a fluid (e.g., cement) down a wellbore.

The control stand with the main PLC 110 is coupled to a port of the Ethernet switch 111 over an Ethernet line 134. The control stand with encoders that are used for speed and torque control is also coupled to the motor control PLC 112 over an encoder control line 132. The motor control PLC 112 is further coupled to a port of the Ethernet switch 111 over an Ethernet line 133. The motor control PLC 112 is also coupled to the control stand's HMI 115 through an Ethernet line 131.

The DP/DP coupler 113 (i.e., network coupler) couples the motor control 1 PLC 112 to the rig's VFD PLC 103 over respective communication lines 120. The DP/DP coupler 113 communicates using a predetermined communication standard such as Process Field Bus (Profibus) DP for fieldbus communication in automation.

Profibus DP is an operational protocol to operate sensors and actuators via a centralized controller in production or field automation applications. Profibus DP includes three separate layers—the Application Layer, Security Layer, and Bit-transmission Layer—each of which plays a specific purpose in packaging and delivering high-level information from process equipment to the main control systems.

The motor control PLC 112 is coupled to the electric motor 114 over sensor lines 135. For example, the electric motor 114 may provide temperature, moisture, or other real-time motor condition data front sensors to the motor control PLC 112 over the sensor lines 135. The motor control PLC 112 may use the real-time sensor inputs as another factor in controlling the motor 114. For example, if the sensors indicate an over-temperature condition front the motor 114, the motor control PLC 112 may reduce the speed of the motor in order to reduce the temperature.

The motor control PLC 112 shares information with the main PLC 110 and the remote room controller 105 through the Ethernet connection (i.e., connection 133, switch 111, connection 134, connection 122) since each component is plugged into the Ethernet switch 111. The information being shared includes motor speed set point, actual motor speed, actual torque, torque limit set point, power (kW), horsepower (HP), current (Amps), frequency (Hz), VFD status (enabled/disabled), and motor temperature. VFD alarms, moisture sensor, leak sensor and blower pressure alarms are also monitored. This information is shared so it can be seen by operators in the remote room and the main displays on the control stand.

In an example of operation, the HMI 106 of the rig 101 may be assigned primary control input to the motor 114 while the HMI 115 of the skid 102 may be assigned back-up control of the motor 114 in case of a fault in the primary control. Switching between the skid HMI 115 and the rig HMI 106 as the control input to the motor control PLC 112, over the Ethernet line 133, 134, is accomplished through the Ethernet switch 111.

The main PLC HMI 115 and the remote room HMI 106 are connected to and communicating via Ethernet connections 122, 133, 134 with the main PLC 110 and motor control PLC 112. Even though both HMIs 106, 115 see the real-time motor condition data, only one HMI 106, 115 may be used to control the equipment at any one time. Exchange of control may be accomplished by an operator at only one of either HMI 106, 115 executing a control that requests control from the other HMI 106, 115. For example, if a request for control comes from the Main PLC HMI 115, a message on the remote room HMI 106 will state that another HMI is requesting control. The message may give the operator of the remote room 106 an option to accept or deny that request. The request for control can occur in the opposite direction as well. If there is no operator at the HMI receiving the control request, control will automatically be pulled to the requesting HMI after a predetermined wait period of time.

An operator at the rig's HMI 106 (or the back-up HMI 115) may input a control command to the electric motor 114 through the Ethernet switch 111 to the motor control PLC 112. The motor control PLC 112 uses the motor control algorithm then transmits the processed data, over the communication line 120, to the VFD PLC 103. The VFD PLC 103 sends a signal to the VFD 104, over the communication line 123, to instruct the VFD 104 to generate the proper input frequency, voltage and/or PWM power to be input to the electric motor 114 over the power control line 121 in order to accomplish the desired command.

The data that is transmitted from the primary HMI 106 or from the encoder of the main control stand, over the encoder control line 132, may include the revolutions per minute (RPM) set point and the torque limit set point for the motor shaft. The encoder, located in the control stand, is an electromechanical device that converts the angular rotation of the encoder shaft into an analog signal or digital code. This code is translated in the motor control PLC 112 and may be used to control the rotational speed and/or torque.

The data being read back from the motor VFD 104, via the VFD PLC 103, includes the actual RPM/Speed, the torque limit set point, the actual motor torque, maximum RPM, maximum torque limit, enabled/disabled state of the drive, frequency, current, motor power, as well as faults that have been issued from the motor. This data may be displayed on the primary HMI 106 and/or the back-up HMI 115.

FIG. 2 is a block diagram showing a control configuration for redundancy of a VFD motor control system with a plurality of motors, according to various examples of the disclosure. For purposes of clarity, not all of the functions of FIG. 1 are illustrated in FIG. 2. For example, the remote room controller HMI 106 may be included in a main console 210 as part of the system controller. A DP/DP coupler 113 may be included in each of a motor A PLC 204 and a motor B PLC 205.

Motor A 201 and motor B 202 may be mounted on the same skid or separate skids. The motors 201, 202 are coupled encoders that supply the VFD with an actual speed of the motor to their respective encoder cables 230, 231 from their respective VFD or VFD PLC 220, 221 that each include respective encoders. Depending on the configuration of the VFD, other embodiments may not use the encoders. Each motor's respective PLC 204, 205 are coupled to its motor 201, 202 through the motor sensor lines 240, 241. The motor A PLC 204 may be mounted on the same skid as the motor A 201 and the motor B PLC 205 may be mounted on the same skid as motor B 202.

Each motor's respective VFD or VFD PLC 220, 221 is coupled to the respective motor PLC 204, 205 through the Profibus DP/DP coupler and control line 260, 261. The main console 210 (e.g., main PLC, main controller) is coupled to the motor A PLC 204 and the motor B PLC 205 through separate Ethernet lines 270, 271 for HMI, separate Ethernet lines 280, 281, to Ethernet switch and separate discrete lines 290, 291 for motor shaft speed and torque control signals as well as remote/local switch control. The main console 210 has the responsibility for overall control of the system. Connections 260, 261, 270, 271, 280, 281 are digital connections (e.g., Ethernet) are part of a network of connections.

The PLC controllers, along with the HMIs, are networked in such a way that provides multiple layers of redundancy in the example of FIGS. 1 and 2. For example, if the HMI is faulty in the remote room, the operator is able to see real time motor feedback and control the motor from the skid HMI. If the HMI on the skid is faulty, in addition to the HMI in the remote room, the operator has two motor control HMIs to display motor data. If the main PLC is faulty, the operator can continue to operate the plurality of motors from encoders on the console and still have motor data displayed on the motor control HMIs. If one of the two motor control PLCs go out, the operator may be able to continue using the other motor controller to finish the job.

The embodiments also provide fault data that may not be conventionally available or easily accessible. The following fault conditions are continuously monitored and/or displayed, and may also logged, if they occur: VFD PLC Profibus DP communication status, DP/DP coupler communication status, motor drive faults such as drive disabled, drive tripped, drive in remote mode, general alarms/warnings have occurred, moisture sensor fault, leak sensor fault, motor temperature fault, over pressure kick out (OPKO), and/or E-Stop.

Figure 3:
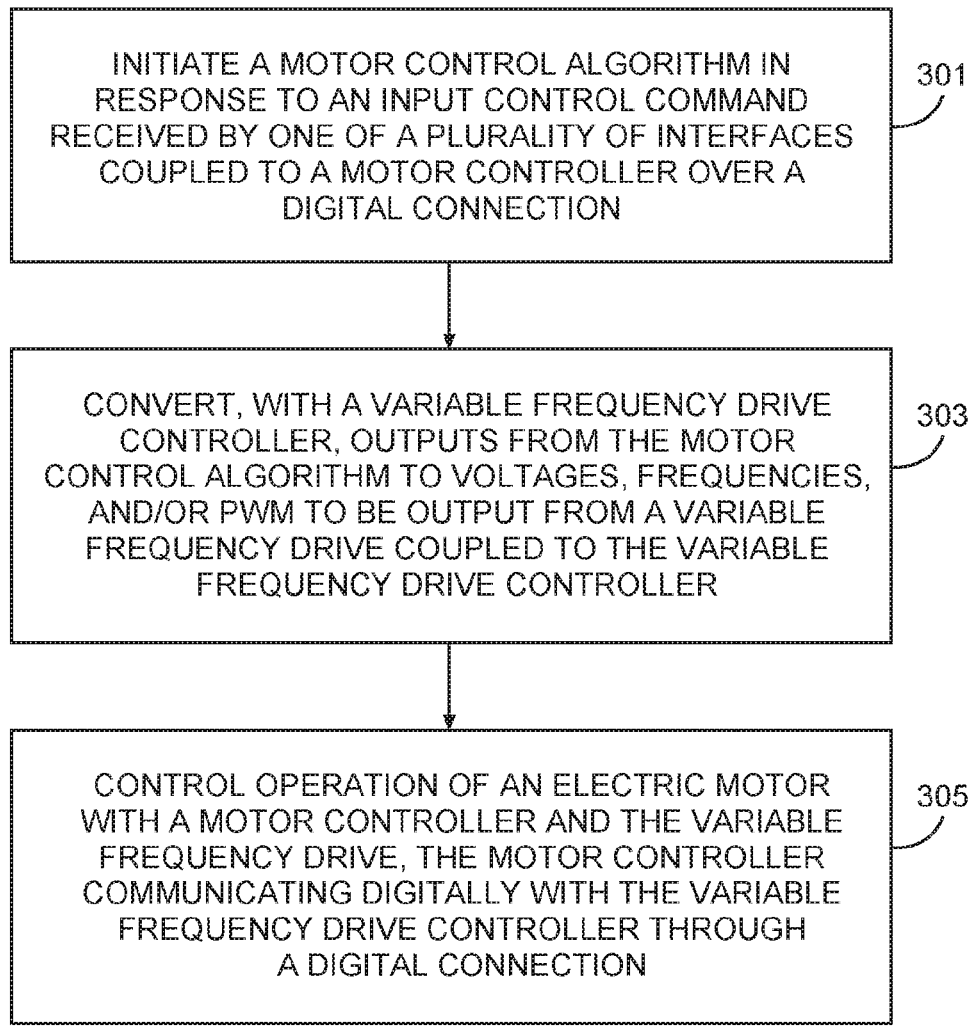
FIG. 3 is a flowchart showing a method for controlling a VFD and electrical motor, according to various examples of the disclosure.

FIG. 3 is a flowchart showing a method for controlling a VFD and electrical motor, according to various examples of the disclosure. The method of FIG. 3 is for purposes of illustration only as the apparatus and systems of FIGS. 1 and 2 may be operated with different methods.

In block 301, a motor control algorithm is initiated in response to an input control command received by one of a plurality of interfaces coupled to a motor controller over a digital connection. The motor control algorithm determines how to start and stop the motors under normal conditions, how to start and stop the motors under different special situations (e.g., faults, OPKO, when to turn on/off blower motors, and/or acceleration/deceleration rates of the motor shaft.

In block 303, a variable frequency drive converts outputs from the motor control algorithm to voltages, frequencies, and/or PWM signals to be output from a variable frequency drive coupled to the variable frequency drive controller. The outputs from the motor control algorithm may comprise a motor shaft RPM/speed set point and a torque limit set point.

In block 305, operation of an electric motor is controlled with a motor controller and the variable frequency drive responsive to the voltages, frequencies, and/or PWM, the motor controller communicating digitally with the variable frequency drive controller through a digital connection.

Figure 4:
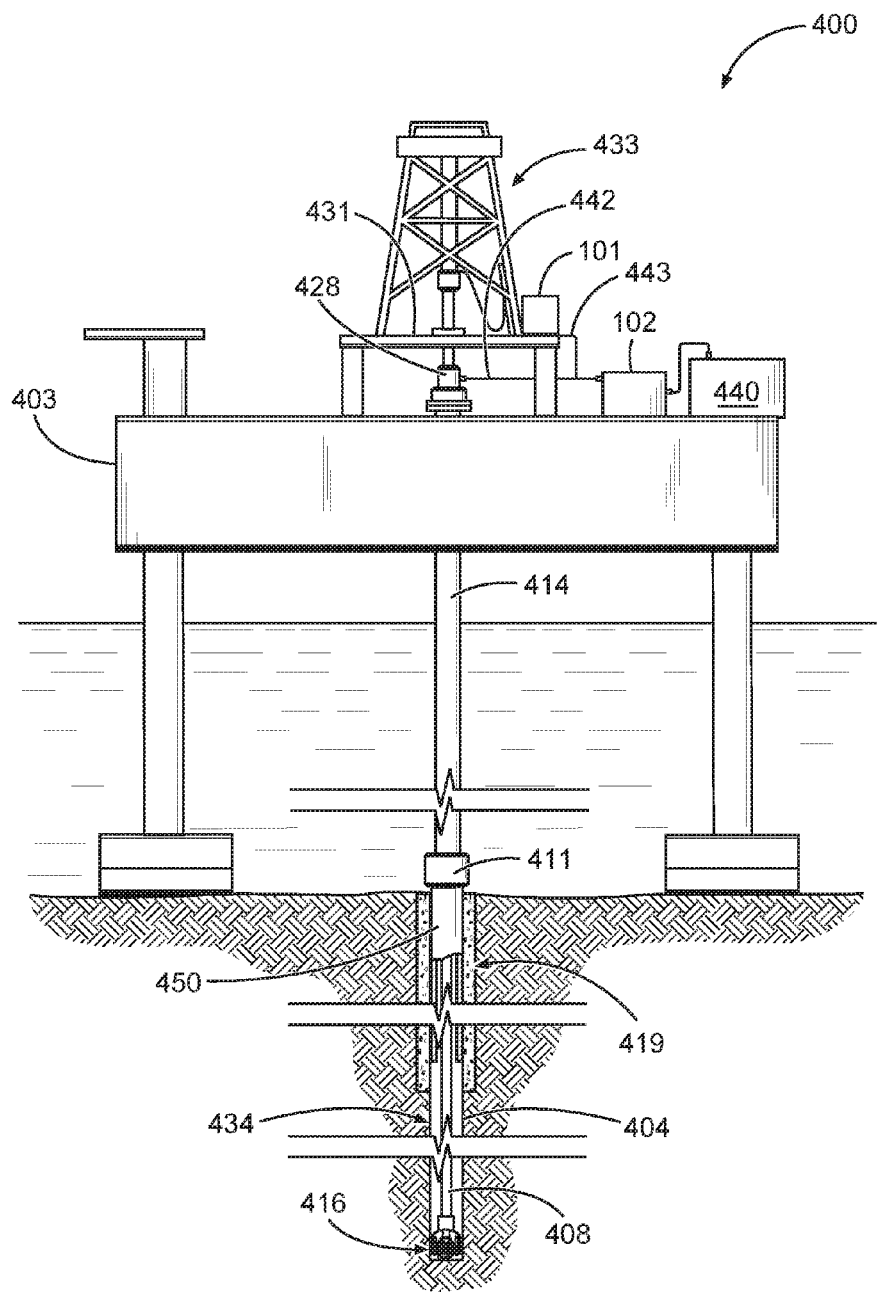
FIG. 4 is a diagram of a drilling system comprising a drilling installation in the example form of art offshore rig that includes a skid, according to various examples of the disclosure.

FIG. 4 is a diagram of a drilling system comprising a drilling installation 400 in the example form of an offshore rig that includes a skid 102, according to various examples of the disclosure. The system 400 comprises a drilling installation that includes any one of multiple types of offshore drill rigs 403 (e.g., floating semi-submersible, jackup, barge, drill ship, etc) which is used to drill a subsea borehole 404 by means of a drill string 408 suspended from and driven by the drill rig 403. In other embodiments, the disclosed method and apparatus may be used in different drill rig configurations, including both offshore and land drilling.

The drill string 408 comprises sections of drill pipe suspended from a drilling platform 433 on the drill rig 403. A downhole assembly or bottom hole assembly (1314A) at a bottom end of the drill string 408 includes a drill bit 416 which is driven at least in part by the drill string 408 to drill into Earth formations, thereby piloting the borehole 404. Part of the borehole 404 may provide a wellbore 419 that comprises a casing hung from a wellhead 411 on the seafloor. A marine riser 414 extends from the wellhead 411 to the drill rig 403. A rotating control device (RCD) 428 is positioned below a rig floor 431 provided by the drilling platform 433. The drill string 408 thus extends from the rig floor 431, through the RCD 428, the riser 414, the wellhead 411, the wellbore casing, and along the borehole 404.

A skid 102 is coupled to a remote room controller/WI) 101 on the rig 433, as illustrated in FIG. 1. After removal of the drill string 408, the motors of a pump system on the skid 102 deliver pressurized cement slurry from a container 440 on the drill rig 403 to a supply line 443 connected to an interior conduit of the drilling platform 433. The cement is forced downhole through the casing 450 in the wellbore 419 and up through the annulus between the casing 450 and the wellbore 419.

Figure 5:
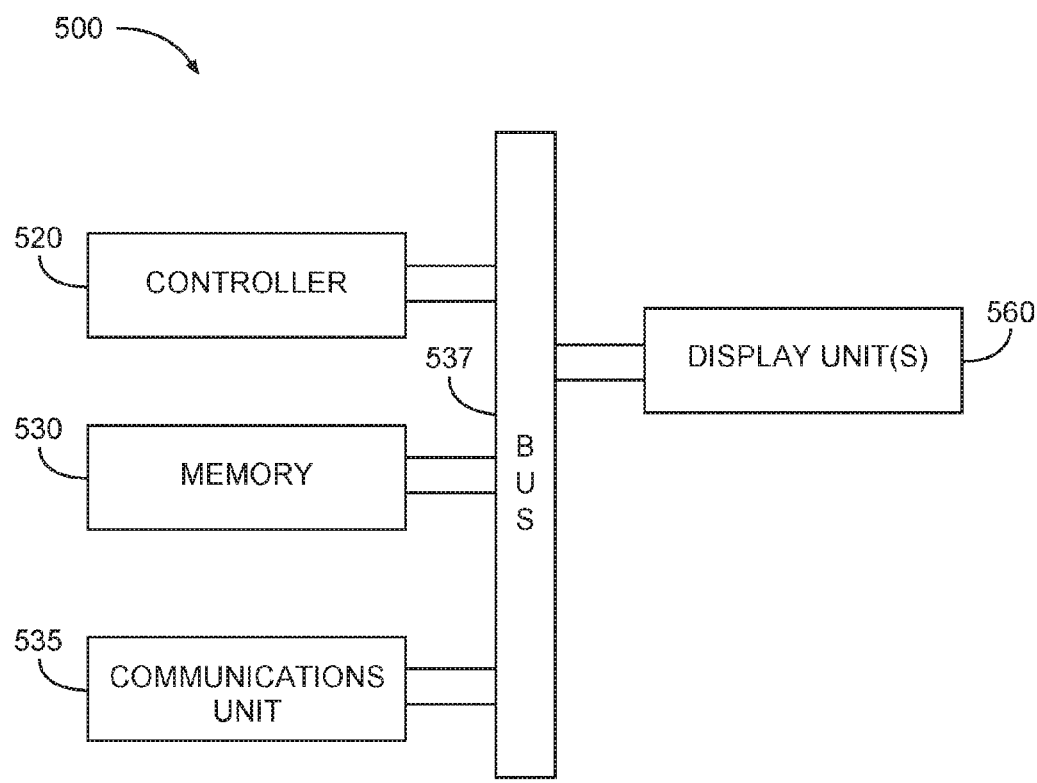
FIG. 5 is a block diagram of an example controller system operable to implement the activities of multiple methods, according to various examples of the disclosure.

FIG. 5 is a block diagram of an example system 500 operable to implement the activities of multiple methods, according to various examples of the disclosure. The system 500 may be implemented as shown in FIGS. 1 and 2 with reference to the PLC blocks 103, 110, 112, 204, 205, 220, 221 and/or the HMI blocks 106, 115.

The system 500 may include circuitry such as a controller 520, a memory 530, and a communications unit 535. The memory 530 may be structured to include a database. The controller 520, the memory 530, and the communications unit 535 may be arranged to operate as control circuitry to control operation of systems of FIGS. 1 and 2 and execute any methods disclosed herein in order to control one or more motors for injecting cement into a borehole.

The communications unit 535 may include communications capability for various protocols (e.g., Protibus). Such communications capability may include wired communication technologies and wireless technologies.

The system 500 may also include a bus 537 that provides electrical conductivity among the components of the system 500. The bus 537 can include an address bus, a data bus, and a control bus, each independently configured or in an integrated format. The bus 537 may be realized using a number of different communication mediums that allows for the distribution of components of the system 500. The bus 537 may include a network. Use of the bus 537 may be regulated by the controller 520.

The system 500 may include display unit(s) 560 as a distributed component on the surface of a wellbore, which may be used with instructions stored in the memory 530 to implement a user interface to monitor/control the operation of the systems of FIGS. 1 and 2 or components distributed within the system 500. Such a user interface may be operated in conjunction with the communications unit 535 and the bus 537.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Further examples may include:

Example 1 is an apparatus comprising: a main controller having a first user interface; an electric motor coupled to and operable to be controlled by a variable frequency drive, the variable frequency drive coupled to and operable to be controlled by a variable frequency drive controller; a motor controller coupled to the electric motor and the main controller; a network switch coupled, over respective digital connections, to the main controller, the motor controller, and a remote controller having a second user interface, the network switch operable to switch data between the main controller, the remote controller, and the motor controller; and a network coupler coupled between the variable frequency drive controller and the motor controller, wherein one of the first user interface or the second user interface is operable to control operation of the electric motor through the digital connections and the network coupler.

In Example 2, the subject matter of Example 1 can further include wherein the main controller and the first user interface are disposed on a skid and the remote controller and the second user interface are disposed on a rig.

In Example 3, the subject matter of Examples 1-2 can further include wherein the main controller further comprises an encoder coupled to the motor controller over an encoder control line to convert an angular velocity of the encoder shaft into an analog signal or a digital code.

In Example 4, the subject matter of Examples 1-3 can further include wherein the electric motor is coupled to the motor controller over sensor lines.

In Example 5, the subject matter of Examples 1-4 can further include wherein the sensor lines are operable to provide real-time motor condition outputs from the electric motor.

In Example 6, the subject matter of Examples 1-5 can further include wherein the real-time motor condition outputs comprise temperature and moisture.

In Example 7, the subject matter of Examples 1-6 can further include wherein the network coupler is a decentralized peripheral coupler using a process field bus (Profibus) communication standard.

In Example 8, the subject matter of Examples 1-7 can further include wherein the first and second user interfaces comprise graphical user interfaces.

Example 9 is a system comprising: a first controller to control the system; a plurality of motor controllers coupled to the first controller, each motor controller coupled to the first controller over a respective digital connection; a plurality of variable frequency drives, each variable frequency drive coupled to a respective one of the plurality of motor controllers with a digital network connection; and a plurality of electric motors, each electric motor coupled to a respective one of the plurality of motor controllers and a respective one of the plurality of variable frequency drives.

In Example 10, the subject matter of Example 9 can further include wherein the digital connections are Ethernet connections.

In Example 11, the subject matter of Examples 9-10 can further include wherein the plurality of variable frequency drives include variable frequency drive controllers.

In Example 12, the subject matter of Examples 9-11 can further include wherein each of the plurality of motors is coupled to its respective variable frequency drive over power supply cables and, in response to a configuration of its respective variable frequency drive, an encoder cable.

In Example 13, the subject matter of Examples 9-12 can further include wherein the plurality of motor controllers are coupled to the first controller over decentralized peripheral process field bus communication standard lines, Ethernet lines, and discrete wiring.

In Example 14, the subject matter of Examples 9-13 can further include wherein the Profibus wiring provides motor shaft speed and torque control signals from the first controller to the plurality of motor controllers.

In Example 15, the subject matter of Examples 9-14 can further include wherein the plurality of motors are each coupled to their respective motor controller over motor sensor connections that provide real time motor condition data.

Example 16 is a method comprising: initiating a motor control algorithm in response to an input control command received by a user interface of a plurality of interfaces coupled to a motor controller over a digital connection; converting, with a variable frequency drive controller, outputs from the motor control algorithm to voltages, frequencies, and/or PWM to be output front a variable frequency drive coupled to the variable frequency drive controller; and controlling operation of an electric motor with a motor controller and the variable frequency drive responsive to the voltages, frequencies, and/or PWM, the motor controller communicating digitally with the variable frequency drive controller through a digital connection.

In Example 17, the subject matter of Example 16 can further include a second interface of the plurality of interfaces requesting control transfer from the user interface.

In Example 18, the subject matter of Examples 16-17 can further include transferring control of the electric motor from the user interface to the second interface after a predetermined time of no response from the first interface and vice versa.

In Example 19, the subject matter of Examples 16-18 can further include the motor controller receiving real-time motor condition information front the electric motor.

In Example 20, the subject matter of Examples 16-19 can further include wherein the outputs from the motor control algorithm comprise a motor shaft RPM/speed set point and a torque limit set point.

The detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The detailed description is, therefore, not to be taken in a limiting sense.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. An apparatus comprising:
   a main controller having a first user interface;
   an electric motor coupled to and operable to be controlled by a variable frequency drive, the variable frequency drive coupled to and operable to be controlled by a variable frequency drive controller;
   a motor controller coupled to the electric motor and the main controller;

a network switch coupled, over respective digital connections, to the main controller, the motor controller, and a remote controller having a second user interface, the network switch operable to switch data between the main controller, the remote controller, and the motor controller; and a network coupler coupled between the variable frequency drive controller and the motor controller, wherein one of the first user interface or the second user interface is operable to control operation of the electric motor through the digital connections and the network coupler.

2. The apparatus of claim 1, wherein the main controller and the first user interface are disposed on a skid and the remote controller and the second user interface are disposed on a rig.

3. The apparatus of claim 2, wherein the main controller further comprises an encoder coupled to the motor controller over an encoder control line to convert an angular velocity of the encoder shaft into an analog signal or a digital code.

4. The apparatus of claim 1, wherein the electric motor is coupled to the motor controller over sensor lines.

5. The apparatus of claim 4, wherein the sensor lines are operable to provide real-time motor condition outputs from the electric motor.

6. The apparatus of claim 5, wherein the real-time motor condition outputs comprise temperature and moisture.

7. The apparatus of claim 1, wherein the network coupler is a decentralized peripheral coupler using a process field bus (Profibus) communication standard.

8. The apparatus of claim 1, wherein the first and second user interfaces comprise graphical user interfaces.

* * * * *